United States Patent
Severin et al.

(10) Patent No.: US 12,031,044 B2
(45) Date of Patent: Jul. 9, 2024

(54) PROCESS FOR PREPARING WHITENED FLY ASH

(71) Applicant: VECOR IP HOLDINGS LIMITED, Kowloon (HK)

(72) Inventors: Erik Severin, Kowloon (HK); Erwin N. Fernandez, Kowloon (HK); John Vincent Adap Misa, Kowloon (HK)

(73) Assignee: Vecor IP Holdings Limited, Hong Kong (HK)

( * ) Notice: Subject to any disclaimer, the term of this patent is extended or adjusted under 35 U.S.C. 154(b) by 0 days.

(21) Appl. No.: 18/020,772

(22) PCT Filed: Aug. 13, 2021

(86) PCT No.: PCT/EP2021/072598
§ 371 (c)(1),
(2) Date: Feb. 10, 2023

(87) PCT Pub. No.: WO2022/034214
PCT Pub. Date: Feb. 17, 2022

(65) Prior Publication Data
US 2023/0287220 A1    Sep. 14, 2023

(30) Foreign Application Priority Data

Aug. 14, 2020 (EP) .................................. 20191116

(51) Int. Cl.
| | | |
|---|---|---|
| *C09C 3/00* | (2006.01) |
| *B03B 9/04* | (2006.01) |
| *B03C 1/00* | (2006.01) |
| *B03C 1/28* | (2006.01) |
| *B03C 1/30* | (2006.01) |
| *B09B 3/35* | (2022.01) |
| *B09B 3/40* | (2022.01) |
| *B09B 3/70* | (2022.01) |
| *C08K 11/00* | (2006.01) |
| *C09C 1/00* | (2006.01) |
| *C09C 3/04* | (2006.01) |
| *C09D 7/40* | (2018.01) |
| *C09D 7/61* | (2018.01) |
| *B09B 101/30* | (2022.01) |

(52) U.S. Cl.
CPC ............... *C09C 3/006* (2013.01); *B03B 9/04* (2013.01); *B03C 1/002* (2013.01); *B03C 1/28* (2013.01); *B03C 1/30* (2013.01); *B09B 3/35* (2022.01); *B09B 3/40* (2022.01); *B09B 3/70* (2022.01); *C08K 11/005* (2013.01); *C09C 1/0009* (2013.01); *C09C 3/003* (2013.01); *C09C 3/041* (2013.01); *C09C 3/043* (2013.01); *C09D 7/61* (2018.01); *C09D 7/69* (2018.01); *B03C 2201/18* (2013.01); *B03C 2201/20* (2013.01); *B09B 2101/30* (2022.01); *C01P 2004/52* (2013.01); *C01P 2004/61* (2013.01); *C01P 2006/80* (2013.01); *C08K 2201/005* (2013.01)

(58) Field of Classification Search
CPC ......... B03B 9/04; B03C 1/002; B03C 1/0332; B03C 1/0335; B03C 1/28; B03C 1/30; B03C 2201/18; B03C 2201/20; B07B 1/00; B07B 15/00; B07B 2230/01; B09B 2101/30; B09B 3/35; B09B 3/40; B09B 3/70; C09C 1/0009; C09C 3/003; C09C 3/006; C09C 3/041; C09C 3/043; C08K 11/00; C08K 11/005; C08K 2201/005
See application file for complete search history.

(56) References Cited

U.S. PATENT DOCUMENTS

| | | |
|---|---|---|
| 4,121,945 A | 10/1978 | Hurst et al. |
| 4,626,416 A | 12/1986 | DeVoe et al. |
| 5,047,145 A | 9/1991 | Hwang |
| 2002/0017224 A1 | 2/2002 | Horton |

(Continued)

FOREIGN PATENT DOCUMENTS

| | | |
|---|---|---|
| CN | 105419406 A | 3/2016 |
| GB | 2495749 A | 4/2013 |
| JP | H07185501 A * | 7/1995 |

(Continued)

OTHER PUBLICATIONS

Extended European Search Report for European Application No. 191 91 851.5, dated Feb. 20, 2020, 8 pages.
Extended European Search Report for European Application No. 201 91 116.1, dated Feb. 11, 2021, 5 pages.
International Search Report and Written Opinion for International Application PCT/EP2021/072598, dated Dec. 22, 2021, 12 pages.
Brazilian Office Action for Application No. 112023002622-9, dated Oct. 18, 2023 with partial translation, 6 pages.

*Primary Examiner* — Shuangyi Abu Ali
(74) *Attorney, Agent, or Firm* — Buchanan Ingersoll & Rooney PC

(57) ABSTRACT

A process for preparing whitened fly ash includes the steps of: (a) subjecting fly ash to a size classification step to obtain size classified fly ash having a particle size such that at least 90 wt % has a particle size of from 44 μm to 250 μm; (b) optionally, contacting the size classified fly ash from step (a) with water to form a slurry, wherein the slurry has a solid content of less than 40 wt %; (c) subjecting the slurry obtained in step (b) to an exhaustive magnetic separation step to form magnetically treated fly ash, wherein the exhaustive magnetic separation step includes a first magnetic extraction step and a second magnetic extraction step, wherein the second magnetic extraction step is carried out at a higher magnetic field strength than the first magnetic extraction step; and (d) subjecting the magnetically treated fly ash obtained in step (c) to milling to form whitened fly ash.

12 Claims, No Drawings

(56) References Cited

U.S. PATENT DOCUMENTS

| | | | |
|---|---|---|---|
| 2015/0211094 A1* | 7/2015 | Vaisanen | C01G 55/00 423/21.1 |
| 2016/0032421 A1* | 2/2016 | Boudreault | C01F 5/30 423/163 |

FOREIGN PATENT DOCUMENTS

| | | |
|---|---|---|
| JP | 2003047930 A | 2/2003 |
| JP | 2004083441 A | 3/2004 |
| JP | 2010236118 A | 10/2010 |
| JP | 2011099174 A | 5/2011 |
| JP | 2013193078 A | 9/2013 |
| KR | 101243094 B1 | 3/2013 |
| WO | 9937592 A1 | 7/1999 |
| WO | 0048960 A1 | 8/2000 |
| WO | 2019207435 A1 | 10/2019 |
| WO | 2020079029 A1 | 4/2020 |
| WO | 2020079031 A1 | 4/2020 |

* cited by examiner

PROCESS FOR PREPARING WHITENED FLY ASH

FIELD OF THE INVENTION

The present invention relates to a process for preparing whitened fly ash. The whitened fly ash obtained by the process of the present invention may be used as a material for making ceramic products, or as a filler/extender for use in paint, rubber, and/or plastics.

BACKGROUND OF THE INVENTION

Fillers and Extenders for Use in Products

Many products, such as plastics and paints, contain fillers or extenders. Fillers or extenders are typically inert, low-cost fine powders that can be added to a composition or product to help reduce the amount of more expensive raw materials, such as plastic or pigment, that need to be used, or to change the physical properties of the product. White paints, for example, very often contain other white powder, such as calcium carbonate and/or calcium silicate, in addition to the main white pigment. This helps "extend" expensive pigments such as $TiO_2$ such that lower levels are needed to achieve a given level of whiteness. A basic paint, such as a whitewash, may only contain materials like calcium carbonate as a pigment.

Sometimes ceramic products and ceramic-based materials need to have a white base colour. This can be due to many reasons, for example to make colour matching easier, or to achieve a particular colour, or just the aesthetic desire to have a white product. It is necessary when making white ceramics or ceramic-based materials to have white raw materials.

It is often easier to avoid colour issues when adding fillers to plastics if the filler is as white as possible. This often makes any required colour matching easier.

These fillers are used on a huge scale in many different industries and applications. There is therefore great value in finding low-cost and environmentally-friendly materials which can be used in this role. The use of such materials is enhanced, and the range of applications is wider, if the colour is as white as possible.

Fly Ash

Combustion ash divides into fly ash, which is the very fine ash removed from the exhaust gases from the combustor, and bottom ash, which contains the larger cinders removed from the grate or bottom of the combustor. The large majority of ash is in the form of fly ash. Bottom ash is very different physically and also chemically to fly ash.

Fly ash, especially coal combustion fly ash, and especially pulverised coal combustion (PCC) fly ash, is a waste material produced in very large quantities during the combustion of coal for electricity generation. Different designs of boiler produce different types of ashes due to differences in the fuels they can burn and any additives, such as limestone, added to the coal. Pulverized coal-fired boilers produce PCC fly ash. Much of this PCC fly ash is used as a pozzolan, especially the finer PCC fly ash, but much of the remainder still goes to landfill and other waste disposal sites. There is therefore a constant need to find additional uses for this waste fly ash in order to minimise ash disposal issues. Replacing raw materials used in other processes with waste fly ash has environmental and economic benefits. This is especially the case for coarser PCC fly ash, which is too coarse for use as a pozzolan and which currently has very little value.

Hence, low-cost and simple processes that can use less desirable, off-white, coarser fly ash to form a white, finer, cheap and environmentally friendly filler material would be especially valuable.

Fly ashes, including PCC fly ashes, have a range of chemical and mineralogical compositions and forms depending on the type of coal burnt and the boiler design used.

In particular, fly ash contains variable amounts of iron oxides and unburnt carbon. In PCC fly ash, iron oxide is often present in the form of small dark-coloured crystals, such as magnetite and/or haematite. Iron oxides and unburnt carbon are the predominant causes of the grey or off-white colour characteristic of many ashes. These poor colours limit the scope for fly ash "as is" to be used as a filler or extender.

Fly ash is commonly beneficiated. This term refers to processes that typically reduce the amounts of iron oxides and unburnt carbon so as to make the fly ash more suitable for use as a pozzolan. Beneficiation is mostly concerned with chemical compatibility in cements rather than improvements in colour. Whilst most beneficiation processes will make fly ash slightly whiter, the vast majority of processes described in the art are not designed or intended to make the fly ash white enough for use in more demanding applications such as a paint extender.

There are many processes which will change the colour of fly ash. Processes based on conventional calcination, milling and/or classification and magnetic extraction can all change the colour of fly ash. However, they are not capable of making the material white enough to be possibly used as a white filler or pigment extender or as a basic pigment.

The Need for a Process to Produce Whitened Fly Ash

There is therefore a need to develop a process that can improve the whiteness of fly ash, especially PCC fly ash, and especially coarse PCC fly ash. There is a need for a process to change the fly ash into a material that is sufficiently white so that the whitened fly ash can be used for making ceramic products or be used as a filler/extender for use in paint, rubber and/or plastics. Such a process needs to be as simple and cheap as possible, and as environmentally friendly as possible.

SUMMARY OF THE INVENTION

The present invention relates to a process for preparing whitened fly ash, wherein the process comprises the steps of: (a) subjecting fly ash to a size classification step to obtain size classified fly ash having a particle size such that at least 90 wt % has a particle size of from 44 μm to 250 μm; (b) optionally, contacting the size classified fly ash from step (a) with water so as to form a slurry, wherein the slurry has a solid content of less than 40 wt %; (c) subjecting the size classified fly ash obtained in step (a) or the slurry obtained in step (b) to an exhaustive magnetic separation step to form magnetically treated fly ash, wherein the exhaustive magnetic separation step comprises a first magnetic extraction step and a second magnetic extraction step, wherein the second magnetic extraction step is carried out at a higher magnetic field strength than the first magnetic extraction step; and (d) subjecting the magnetically treated fly ash obtained in step (c) to a milling step to form whitened fly ash.

DETAILED DESCRIPTION OF THE INVENTION

Process for Preparing Whitened Fly Ash

The process comprises the steps of:
(a) subjecting fly ash to a size classification step to obtain size classified fly ash having a particle size such that at least 90 wt % has a particle size of from 44 μm to 250 μm;
(b) optionally, contacting the size classified fly ash from step (a) with water so as to form a slurry, wherein the slurry has a solid content of less than 40 wt %;
(c) subjecting the size classified fly ash obtained in step (a) or the slurry obtained in step (b) to an exhaustive magnetic separation step to form magnetically treated fly ash, wherein the exhaustive magnetic separation step comprises a first magnetic extraction step and a second magnetic extraction step, wherein the second magnetic extraction step is carried out at a higher magnetic field strength than the first magnetic extraction step; and
(d) subjecting the magnetically treated fly ash obtained in step (c) to a milling step to form whitened fly ash.

Step (a), Size Classification

In step (a), the fly ash is subjected to a size classification step to obtain size classified fly ash having a particle size such that at least 90 wt %, or at least 95 wt %, has a particle size of from 44 μm to 250 μm, or from 50 μm to 250 μm, or from 75 μm to 250 μm. It may be preferred that the fly ash is subjected to a size classification step to obtain size classified fly ash having a particle size such that 100 wt % has a particle size of from 44 μm to 250 μm, or from 50 μm to 250 μm, or from 75 μm to 250 μm. The classification can be carried out in an air classifier.

This coarser fly ash, whilst too coarse to use as a pozzolan and which often is dark due to a higher concentration of larger unburnt carbon particles, has surprisingly been found to be particularly suitable for purification by magnetic extraction, and especially wet magnetic extraction. Coarser fly ash can be purified to a higher degree by magnetic extraction than finer fly ash. Without wishing to be bound by theory, it is believed that the larger a magnetically-susceptible particle is, the greater the force it will experience in a magnetic field due to the greater amount of magnetically-susceptible material present. The amount of material present in a particle of a given diameter is a function of the cube of the diameter. In contrast, the viscous drag experienced by a particle moving through a liquid is a function of its diameter. Hence, larger magnetically susceptible particles experience a greater ratio of magnetic force to viscous drag force which will enable an easier removal of the magnetically susceptible particles from a slurry.

Optional Step (b), Forming a Slurry

Optional step (b) contacts the size classified fly ash from step (a) with water so as to form a slurry. The slurry has a solid content of less than 40 wt %, or less than 35 wt %, or even less than 30 wt %.

Preferably step (b) is an essential step and during the step (c) the slurry obtained in step (b) is subjected to an exhaustive magnetic separation step to form magnetically treated fly ash.

Step (c), Magnetic Extraction

Step (c) subjects the size classified fly ash obtained in step (a) or the slurry obtained in step (b) to an exhaustive magnetic separation step to form magnetically treated fly ash. The exhaustive magnetic separation step comprises a first magnetic extraction step and a second magnetic extraction step. The second magnetic extraction step is carried out at a higher magnetic field strength than the first magnetic extraction step. Additional magnetic extraction steps can also be used, typically each subsequent magnetic extraction step is carried out at a higher magnetic field strength than the preceding magnetic extraction step. It may be preferred for a third magnetic extraction step to be carried out, and wherein the third magnetic extraction step is carried out at a higher magnetic field strength than the second magnetic extraction step.

Typically, the magnetically treated fly ash has an iron oxide content of less than 1.0%, or even less than 0.5%.

Step (c) uses an exhaustive process of magnetic extraction and can remove particles even with a very low level of magnetically susceptible iron-containing species so as to leave a residue of highly purified material having a very low iron content. This is different to most magnetic separation steps which either are: (i) designed to only remove particles with high iron content for further processing such as metal extraction; and/or (ii) designed for the beneficiation of fly ash for use as a pozzolan.

The process comprises an exhaustive magnetic extraction step. By exhaustive it is mean that the slurry is subjected to multiple steps of magnetic extraction wherein the intensity of the magnetic field strength is constant, or increased, during each subsequent step. Typically, the slurry is only progressed to the next magnetic-strength extraction step when no more magnetically susceptible material can be extracted at the current magnetic field strength.

If the size classified fly ash or the slurry is subjected to only a single high intensity magnetic extraction step, much of the non-magnetic material is also removed. Without wishing to be bound by theory, it is believed that the non-magnetic material becomes trapped by the bulk of all of the magnetically susceptible material that is removed all in one go.

The inventors have found that if the magnetically susceptible material is removed by a number of magnetic extraction steps, as required by the process of the present invention, then only a limited amount of material is removed in any one step. This in turn improves the overall efficiency of the process and less non-magnetically susceptible material is removed from the size classified fly ash or the slurry during step (c).

Step (c) can be carried out by passing a magnetic bar of a given magnetic field strength through the slurry, typically in a slow and controlled manner so as to avoid removing particles due to drag. The magnetic bar can then be removed from the slurry and the magnetically susceptible material which adheres to the magnetic bar can be removed.

Typically, a first magnetic bar of relatively low magnetic field strength is used until no more magnetically susceptible material is removed by each pass of the magnetic bar through the slurry. Typically, a second magnetic bar of relatively higher magnetic field strength is then used and the magnetic extraction step repeated. Further magnetic extraction steps with each step using a magnetic bar having relatively higher magnetic field strength can be used. This process of repeatedly, and preferably gently, extracting magnetically susceptible material (thus "exhausting" the extraction of magnetically susceptible material at a given magnetic field strength) before moving onto the next step is different to other commercially used processes.

It is preferred if the slurry used in the magnetic extraction step has a solid content of less than 40 wt %, or less than 35 wt %, or even less than 30 wt %. This is because the separation of particles is harder to do in a high solid content slurry because of particle:particle interactions and collisions.

Typically, magnets are passed through the aqueous slurry or the slurry is passed through a magnetic separator. This procedure is typically repeated multiple times, for example until no more magnetically susceptible material is extracted by the magnet. This typically requires a minimum period of treatment time for the slurry to be subjected to the magnetic field. If the magnetic treatment time is too short, the magnetically susceptible material may not have sufficient chance to be removed. A typical minimum treatment time is at least 1 minute, or even at least 5 minutes, or even at least 10 minutes, or even longer. The period of treatment time may be achieved over multiple steps, such as passes through a magnetic separator at a given magnetic field intensity.

A suitable magnetic treatment may be a 1000 Gauss magnetic bar drawn repeatedly through the slurry, followed by a 3000 Gauss magnetic bar drawn repeatedly through the slurry, followed by an 8000 Gauss magnetic bar.

Other types of magnetic separator are also suitable, especially for large-scale industrial processes. Suitable types of separator include so-called Wet High Intensity Magnetic Separators wherein magnetic particles are removed from a slurry by being magnetically attracted to the surface of a rotating drum by application of a suitable magnetic field. Other suitable designs include cascading magnetic separators where the slurry flows by gravity over a magnetic surface. There are multiple designs but all rely on passing material, preferably in slurry form, close to a magnetic surface such that magnetic particles adhere to the surface. The magnetic particles can be washed off or otherwise removed from the surface. The magnetic field can be created by (suitably positioned) permanent magnets or can generated by electromagnets. A preferred approach involves use of one or more magnetic separators having adjustable electromagnets. The slurry can be passed repeatedly through a separator with the magnetic field at a given strength and, once all the magnetic material has been exhaustively extracted at the field intensity, the electromagnet is adjusted so as to increase the magnetic field strength and the process repeated.

Alternatively, the slurry can be repeatedly passed through a first separator set to a lower intensity magnetic field, followed by repeatedly passing through a second separator set to a higher intensity magnetic field to achieve the exhaustive effect. A range of suitable magnetic separators are supplied by the Eriez Company of Erie, Pa, USA.

It may also be preferred for the magnetically treated fly ash obtained in step (c) to undergo a chemical treatment step. A preferred chemical treatment step can be carried out in the presence of a chelant, and preferably also in the presence of both a chelant and an acid.

Preferred chelants may include ethylene diamine disuccinic acid (EDDS), ethylene diamine tetraacetic acid (EDTA), diethylene triamine pentaacetic acid (DTPA), ethylene diamine di(o-hydroxyphenylacetic acid) (EDDHA), 1-hydroxyethane 1,1 diphosphonic acid (HEDP), hydroxyethyl ethylenediamine triacetic acid (HEDTA), and any combination thereof.

During any chelant treatment step, typically the fly ash is contacted with a chelant. Typically, the fly ash and chelant are contacted together with water to form an aqueous slurry. The chelant treatment step can be carried out at an elevated temperature, such as a temperature greater than 50° C., or greater than 60° C., or even greater than 70° C. Typically, the liquid supernatant is removed. The remaining fly ash may be rinsed.

It may be preferred that during step (c) the magnetically treated fly ash is subjected to a calcining and/or sintering step.

It may be preferred that during step (c) the magnetically treated fly ash is subjected to a calcining step, typically at greater than 450° C., or even greater than 500° C., or greater than 600° C., or greater than 750° C., and typically up to 1000° C.

It may be preferred that during step (c) the magnetically treated fly ash is subjected to a sintering step, typically at greater than 1000° C., or even greater than 1100° C., or greater than 1200° C., or even greater than 1300° C. This sintering step may further improve the colour of the magnetically treated fly ash and/or reduce the leachability of materials such as heavy metal ions out of the magnetically treated fly ash.

Step (d), Milling

Step (d) subjects the magnetically treated fly ash obtained in step (c) to a milling step to form whitened fly ash.

In step (d), the magnetically treated fly ash obtained in step (c) is subjected to a milling step to obtain whitened fly ash. Step (d) can be a wet milling step or a dry milling step. Ball mills or vibrating rod mills are suitable equipment whether the milling step is a dry milling step or a wet milling step.

The wet milling step may be an acidic wet milling step wherein the magnetically treated fly ash obtained in step (c) is contacted with an acid and subjected to an acidic wet milling step.

Suitable acids for use in step (d) may include mineral acids and/or organic acids.

Suitable acids for use in step (d) can be selected from acetic acid (ethanoic acid), ascorbic acid ((2R)-2-[(1S)-1,2-dihydroxyethyl]-3,4-dihydroxy-2H-furan-5-one), citric acid, hydrochloric acid, nitric acid, oxalic acid (ethandioic acid), sulphuric acid, and any combination thereof.

A preferred acid is sulphuric acid. Another preferred acid is hydrochloric acid.

Preferably, the acid used in step (d) has a molarity of from 0.2M to 3.0M, or from 0.5M to 2.5M, or even from 1.0M to 2.0M.

Preferably, step (d) is carried out at a pH of less than 6.0, or less than 5.0, or less than 4.0, or less than 3.0, or less than 2.0, or even less than 1.0.

The acidic wet milling step may also be carried out in the presence of a chelant. Suitable chelants are described above (chelants suitable for step (c)).

Step (d) may be carried out at an elevated temperature of 50° C. or greater, or greater than 60° C., or even greater than 70° C.

Step (d) may have a duration of 90 minutes or less, such as from 10 min to 90 min, or from 20 minutes to 80 minutes, or even from 30 to 70 minutes.

Preferably, step (d) can be carried in a ball mill or a rod mill.

The wet milling step may preferably comprise a first acidic milling treatment step and a second acidic milling treatment step. The acid used in the first acidic milling treatment step can be same acid that is used in the second acidic milling treatment step, or different acids can be used. It may be preferred that the acid used in the second acidic milling treatment step has a higher molarity than the acid used in the first acidic milling treatment step. Preferably, the first acidic milling treatment step is carried out in the presence of hydrochloric acid. Preferably, the second acidic milling treatment step is carried out in the presence of oxalic acid.

Preferably, step (d) is carried out at a pH of less than 6.0, or less than 5.0, or less than 4.0, or less than 3.0, or less than 2.0, or even less than 1.0.

Step (d) may be carried out under a pressure that is greater than atmospheric pressure. Step (d) may be carried out at a temperature of greater than 100° C., such as greater than 125° C., or up to 150° C.

It may be preferred that during step (d) the milled magnetically treated fly ash is subjected to a calcining step, typically at greater than 450° C., or even greater than 500° C., or greater than 600° C., or greater than 750° C., and typically up to 1000° C.

It may be preferred that during step (d) the milled magnetically treated fly ash is subjected to a sintering step, typically at greater than 1000° C., or even greater than 1100° C., or greater than 1200° C., or even greater than 1300° C. This sintering step may further improve the colour of the magnetically treated fly ash and/or reduce the leachability of materials such as heavy metal ions out of the magnetically treated fly ash. The sintered fly ash may be further milled.

Fly Ash

Preferably, the fly ash is coal combustion fly ash, most preferably pulverised coal combustion (PCC) fly ash.

The fly ash can be Type F coal fly ash.

Typically, the fly ash is raw fly ash. By raw fly ash it is typically meant that the fly ash has not previously been exposed to any high temperature carbon-removing beneficiation step. This is because high temperature heat-treatment steps reduce the magnetic susceptibility of the fly ash. This can be due to the high temperature converting highly magnetic magnetite to less magnetic hematite or heating magnetic materials such as magnetite to beyond their Curie point.

Size Classified Fly Ash

The size classified fly ash obtained in step (a) may have a particle size distribution such that the $d_{50}$ particle size is greater than 44 μm, or greater than 50 μm, or even greater than 75 μm.

The size classified fly ash obtained in step (a) may have a particle size such that 100 wt % has a particle size of from 44 μm to 250 μm, or from 50 μm to 250 μm, or from 75 μm to 250 μm.

The coarse size classified fly ash is easier to grind than finer fly ash in any post magnetic extraction milling step.

Whitened Fly Ash

The whitened fly ash obtained by the process of the present invention may be used as a filler in ceramics, paint, rubber, and/or plastics.

Typically, the whitened fly ash has an iron oxide content of less than 1.0 wt %, or even less than 0.5 wt %.

Method of Measuring Particle Size

The particle size distribution is typically measured by laser diffraction. A suitable standard for size analysis by laser diffraction is given in ISO 13320:2009. Suitable size analysers are the Mastersizer 2000 and 3000 instruments by Malvern Instruments. It is preferred to disperse the samples by compressed air (typically with a Scirocco 2000 unit) where the material is tested as a powder stream, rather than the wet method where the test material is dispersed in a fluid first. However, it is possible to disperse and test these ceramic mixtures in non-aqueous liquids. The measurement is typically done as per the manufacturer's instruction manual and test procedures.

Method of Measuring Solid Content of a Slurry

The solids content of a slurry can be measured by placing a 100 g sample of the slurry in an oven at 100° C. for 24 hours and measuring the weight of the dry sample. This is the percent solid content.

Method of Measuring Iron Oxide Content

The level of iron oxide is typically measured by X-ray fluorescence. The typical particle size of the fly ash is sufficiently small that the technique is suitable for accurate measurement. The technique works by the excitation of the sample using high energy gamma or X-rays. This causes an ionisation of the atoms present which then emit characteristic frequency EM radiation which is dependent on the type of atom. Analysis of the intensity of different frequencies allows an elemental analysis to be made. Suitable equipment would be the Varta range of XRF analyzers supplied by Olympus. The equipment detects elemental iron and the result is most usually converted to the corresponding level of $Fe_2O_3$.

EXAMPLES

Inventive Example

Whitened fly ash was prepared as follows.

The starting PCC fly ash had a whiteness value of 25 as per ISO 3688.

200 g of PCC fly ash, sieved to between 44 μm and 250 μm, was added to 2000 g of water and stirred to make a slurry.

The slurry was then subjected to an exhaustive magnetic extraction and purification step as follows. A 1000 Gauss bar magnet was manually and repeatedly passed through the slurry to collect any magnetic particles and periodically wiped clean. This was continued until no further magnetic particles could be seen collecting on the surface of the magnet. Then the process was repeated with a 3000 Gauss bar magnet and finally repeated with a high intensity 8000 Gauss bar magnet being used.

After the magnetic extraction step, the slurry was allowed to settle, and the supernatant liquid poured off. The treated fly ash was then dried in an oven at 110° C. for 1 hr.

Next, 150 g of the treated fly ash was placed in a ball mill container (to fit MITR model YXQM-8L) along with 150 g of 1.0M sulfuric acid. About 1250 g of alumina grinding balls were also placed in the container. The alumina balls (density 3.95 g/ml) had the following size distribution: 5 mm (50% wt), 10 mm (32% wt), 20 mm (18% wt).

The slurry was then milled at 180 rpm for 60 min in a planetary ball mill (MITR model YXQM-8L). At the end of the run the slurry was found to be at ~80° C.

After milling, the slurry was centrifuged, and supernatant liquid was poured off. The solid was rinsed by adding 300 g of water to the solid with stirring followed by centrifugation and removal of the liquid. This rinsing step was repeated three times. The wet solid was then dried to constant weight at 110° C.

The dried solid was then calcined by placing it in an oven at 1250° C. for 0.5 hour.

The whitened fly ash had a whiteness value of greater than 86 according to ISO 3688.

The invention claimed is:

1. A process for preparing whitened fly ash, wherein the process comprises the steps of:
   (a) subjecting fly ash to a size classification step to obtain size classified fly ash having a particle size such that at least 90 wt % has a particle size of from 44 µm to 250 µm;
   (b) contacting the size classified fly ash from step (a) with water so as to form a slurry, wherein the slurry has a solid content of less than 40 wt %;
   (c) subjecting the slurry obtained in step (b) to an exhaustive magnetic separation step to form magnetically treated fly ash, wherein the exhaustive magnetic separation step comprises a first magnetic extraction step and a second magnetic extraction step, wherein the second magnetic extraction step is carried out at a higher magnetic field strength than the first magnetic extraction step, and each magnetic extraction step has a duration of at least 1 minute; and
   (d) subjecting the magnetically treated fly ash obtained in step (c) to a wet milling step to form whitened fly ash, wherein the wet milling step is carried out in the presence of an acid.

2. The process according to claim 1, wherein the wet milling step comprises a first acidic milling treatment step and a second acidic milling treatment step, wherein the first acidic milling treatment step is carried out in the presence of hydrochloric acid, and wherein the second acidic milling treatment step is carried out in the presence of oxalic acid.

3. The process according to claim 1, wherein the acid has a molarity of from 0.2M to 3.0M.

4. The process according to claim 1, wherein the acid is selected from acetic acid (ethanoic acid), ascorbic acid ((2R)-2-[(1S)-1,2-dihydroxyethyl]-3,4-dihydroxy-2H-furan-5-one), citric acid, hydrochloric acid, nitric acid, oxalic acid (ethandioic acid), sulphuric acid, and any combination thereof.

5. The process according to claim 4, wherein the acid is sulphuric acid or hydrochloric acid.

6. The process according to claim 1, wherein the wet milling step is carried out in the presence of a chelant.

7. The process according to claim 1, wherein during step (c) the magnetically treated fly ash is subjected to a calcining and/or sintering step.

8. The process according to claim 1, wherein the size classified fly ash obtained in step (a) has a particle size distribution such that a $d_{50}$ particle size is greater than 44 µm.

9. The process according to claim 1 wherein the classified fly ash obtained in step (a) has a particle size such that 100 wt % has a particle size of from 44µm to 250 µm.

10. The process according to claim 1, wherein the fly ash is pulverised coal combustion (PCC) fly ash.

11. The process according to claim 1, wherein the magnetically treated fly ash has an iron oxide content of less than 1.0%.

12. A method of making ceramics, paint, rubber, and/or plastics, wherein the method comprises the steps of:
   (a) subjecting fly ash to a size classification step to obtain size classified fly ash having a particle size such that at least 90 wt % has a particle size of from 44 µm to 250 µm;
   (b) contacting the size classified fly ash from step (a) with water so as to form a slurry, wherein the slurry has a solid content of less than 40 wt %;
   (c) subjecting the slurry obtained in step (b) to an exhaustive magnetic separation step to form magnetically treated fly ash, wherein the exhaustive magnetic separation step comprises a first magnetic extraction step and a second magnetic extraction step, wherein the second magnetic extraction step is carried out at a higher magnetic field strength than the first magnetic extraction step. and each magnetic extraction step has a duration of at least 1 minute;
   (d) subjecting the magnetically treated fly ash obtained in step (c) to a wet milling step to form whitened fly ash, wherein the wet milling step is carried out in the presence of an acid; and
   (e) incorporating the whitened fly ash obtained in step (d) into a ceramic, paint, rubber, and/or plastic.

* * * * *

UNITED STATES PATENT AND TRADEMARK OFFICE
CERTIFICATE OF CORRECTION

PATENT NO. : 12,031,044 B2
APPLICATION NO. : 18/020772
DATED : July 9, 2024
INVENTOR(S) : Erik Severin, Erwin N. Fernandez and John Vincent Adap Misa It is certified that error appears in the above-identified patent and that said Letters Patent is hereby corrected as shown below:

In the Claims

In Claim 12, Column 10, Line 24, delete "making_ceramics," and insert --making ceramics,--

In Claim 12, Column 10, Line 40, delete "step." and insert --step,--

Signed and Sealed this
Twenty-fourth Day of September, 2024

Katherine Kelly Vidal
*Director of the United States Patent and Trademark Office*